(12) United States Patent
Kato

(10) Patent No.: US 7,148,662 B2
(45) Date of Patent: Dec. 12, 2006

(54) ELECTRICAL CIRCUIT FOR REDUCING SWITCHING LOSSES IN A SWITCHING ELEMENT

(75) Inventor: Tsutomu Kato, Yamanashi (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 10/732,488

(22) Filed: Dec. 11, 2003

(65) Prior Publication Data
US 2004/0119447 A1    Jun. 24, 2004

(30) Foreign Application Priority Data
Dec. 16, 2002    (JP) .............................. 2002-364406

(51) Int. Cl.
*G05F 1/613*    (2006.01)
(52) U.S. Cl. ..................... 323/222; 323/282
(58) Field of Classification Search ................ 323/222, 323/271, 272, 282, 351
See application file for complete search history.

(56) References Cited

U.S. PATENT DOCUMENTS

| | | | | |
|---|---|---|---|---|
| 4,999,568 A | * | 3/1991 | Gulczynski | ................. 323/351 |
| 5,844,399 A | * | 12/1998 | Stuart | ........................ 323/282 |
| 6,198,260 B1 | * | 3/2001 | Wittebreder | ............... 323/271 |

FOREIGN PATENT DOCUMENTS

| | | |
|---|---|---|
| JP | 6-311738 A | 11/1994 |
| JP | 2001-197740 A | 7/2001 |
| JP | 2002-112544 A | 4/2002 |
| JP | 2002-153048 A | 5/2002 |
| JP | 2002-262570 A | 9/2002 |

* cited by examiner

*Primary Examiner*—Jeffrey Sterrett
(74) *Attorney, Agent, or Firm*—Sughrue Mion, PLLC

(57) ABSTRACT

A switching power supply circuit which is capable of reducing switching losses which occur when a switching element goes into the on state from the off state or goes into the off state from the on state. Switching elements are alternately actuated to on and off with dead times during which period both the switching elements are off. When one of the switching elements goes into the on state from the off state, a diode that is coupled in parallel with the switching element goes into the on state due to the energy released from a choking coil. Consequently, the switching element is switched on at a voltage of 0V (zero volts). Thus, switching losses can be reduced. Besides, when the switching element goes into the off state from the on state, the voltage rises moderately across the switching element as compared to the current passing through the switching element because of a capacitor that is coupled in parallel with the switching element. Thus, switching losses can be reduced. The same is true in the case of the other switching element.

19 Claims, 11 Drawing Sheets

US 7,148,662 B2

ELECTRICAL CIRCUIT FOR REDUCING SWITCHING LOSSES IN A SWITCHING ELEMENT

FIELD OF THE INVENTION

The present invention relates to a switching power supply circuit for reducing switching losses which occur when a switching element goes into the on state from the off state or goes into the off state from the on state.

BACKGROUND OF THE INVENTION

FIG. 1 is a schematic circuit diagram showing a conventional switching power supply circuit. Generally, the circuit as shown in FIG. 1 has been used as a switching power supply circuit. However, the conventional switching power supply circuit has a problem in that a switching element 21 makes a great switching loss due to a recovery current developed when a diode 24 is in the off state.

Here, the recovery current represents a current which flows in the moment that a reverse-bias voltage is applied to the diode.

In recent years, it has been required to increase the efficiency of power supply equipment to reduce energy consumption. In order to meet this request, there has been proposed a step-up switching power supply circuit capable of reducing the switching losses of switching elements in Japanese Patent Application laid open No. HEI6-311738 (reference 1). FIG. 2 is a schematic circuit diagram showing the conventional step-up switching power supply circuit disclosed in reference 1. FIG. 3 is a timing chart for switching elements 21 and 28 shown in FIG. 2.

In the circuit as shown in FIG. 2, the switching element 28 is turned on just before the switching element 21 is turned on. Besides, immediately after the switching element 21 is turned on, the switching element 28 is turned off.

When the switching element 28 goes into the on state first, the current that is passed through the switching element 28 rises moderately because of a choking coil 30. Consequently, switching losses, which occur when the switching element 28 goes into the on state from the off state, can be reduced.

When the current passing through the choking coil 30 increases so as to be equal to the current passing through a choking coil 20, a capacitor 23 that is connected in parallel with the switching element 21 loses its electric charge due to the resonance (resonant circuit) of the choking coil 30 and the capacitor 23. After the capacitor 23 has finished the discharge, a diode 22 that is connected in parallel with the switching element 21 is switched on. The switching element 21 is turned on while the diode 22 is in the on state, that is, the switching element 21 is switched on when the voltage has fallen to zero (zero-voltage switching). Thus, switching losses can be reduced.

On the other hand, when the switching element 28 goes into the off state from the on state, the voltage rises rapidly across the switching element 28 due to the energy stored in the choking coil 30. Consequently, the switching element 28 incurs switching losses.

The energy stored in the choking coil 30 is discharged through a current pass of the switching element 21, the choking coil 30 and the diode 32.

As described above, the switching power supply circuit shown in FIG. 13 has a problem in that switching losses occur when the switching element 28 is turned off.

There is found other prior art aiming at reducing switching losses and improving efficiency in a switching power supply.

Japanese Patent Application laid open No. 2001-197740 (reference 2) and Japanese Patent Application laid open No. 2002-262570 (reference 3) have disclosed switching power supply equipment, respectively, with a view to enhancing the efficiency of a low-loaded low-loss switching circuit in which capacitors and switching elements are added to the main transformer of a self-excitation flyback converter.

Japanese Patent Application laid open No. 2002-112544 (reference 4) has also disclosed switching power supply equipment, in which, however, a switching power supply circuit has a different input power supply connections than that in the switching power supply equipment of references 2 and 3.

As can be seen in the aforementioned references, in order to reduce switching losses, it is necessary to suppress the rise of the voltage across the switching element. Besides, zero-voltage switching should be performed.

SUMMARY OF THE INVENTION

It is therefore an object of the present invention to overcome the above-described problems and provide a more effective switching power supply which is capable of reducing switching losses.

In accordance with the first aspect of the present invention, to achieve the above object, there is provided a switching power supply circuit which is a step-up circuit for boosting voltage, comprising: a series connection of a first switch circuit with a first choking coil; a series connection of a second switch circuit with a first capacitor; a parallel connection of a load with a second capacitor; a series connection of a diode with a second choking coil; a switch control circuit for controlling switches; and a power supply.

In accordance with the second aspect of the present invention, in the first aspect, the first capacitor is connected to the anode (positive electrode) of the diode.

In accordance with the third aspect of the present invention, in the first aspect, the first capacitor is connected to the cathode (negative electrode) of the diode.

In accordance with the fourth aspect of the present invention, in the first aspect, the first capacitor is connected to the minus or negative terminal of the power supply.

In accordance with the fifth aspect of the present invention, in the first aspect, the power supply is a commercial AC power supply and a rectifier, and the switch control circuit is a power factor improvement circuit.

In accordance with the sixth aspect of the present invention, in one of the second to fifth aspects, the first and second switch circuits each comprise a switching element, a diode and a capacitor which are coupled in parallel with each other.

In accordance with the seventh aspect of the present invention, there is provided a switching power supply circuit which is a step-down circuit for stepping down voltage, comprising: a series connection of a first switch circuit with a first choking coil; a series connection of a second switch circuit with a first capacitor; a parallel connection of a load with a second capacitor; a series connection of a diode with a second choking coil; a switch control circuit for controlling switches; and a power supply.

In accordance with the eighth aspect of the present invention, in the seventh aspect, the first capacitor is connected to the anode (positive electrode) of the diode.

In accordance with the ninth aspect of the present invention, in the seventh aspect, the first capacitor is connected to the cathode (negative electrode) of the diode.

In accordance with the tenth aspect of the present invention, in the seventh aspect, the second switch circuit is connected to the plus or positive terminal of the power supply.

In accordance with the eleventh aspect of the present invention, in the seventh aspect, the power supply is a commercial AC power supply and a rectifier, and the switch control circuit is a power factor improvement circuit.

In accordance with the twelfth aspect of the present invention, in one of the eighth to eleventh aspects, the first and second switch circuits each comprise a switching element, a diode and a capacitor which are coupled in parallel with each other.

In accordance with the thirteenth aspect of the present invention, there is provided a switching power supply circuit which is a booster or step-up/down circuit for stepping up/down voltage, comprising: a series connection of a first switch circuit with a first choking coil; a series connection of a second switch circuit with a first capacitor; a parallel connection of a load with a second capacitor; a series connection of a diode with a second choking coil; a switch control circuit for controlling switches; and a power supply.

In accordance with the fourteenth aspect of the present invention, in the thirteenth aspect, the first capacitor is connected to the anode (positive electrode) of the diode.

In accordance with the fifteenth aspect of the present invention, in the thirteenth aspect, the first capacitor is connected to the cathode (negative electrode) of the diode.

In accordance with the sixteenth aspect of the present invention, in the thirteenth aspect, the second switch circuit is connected to the plus or positive terminal of the power supply.

In accordance with the seventeenth aspect of the present invention, in the thirteenth aspect, the power supply is a commercial AC power supply and a rectifier, and the switch control circuit is a power factor improvement circuit.

In accordance with the eighteenth aspect of the present invention, in one of the fourteenth to seventeenth aspects, the first and second switch circuits each comprise a switching element, a diode and a capacitor which are coupled in parallel with each other.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
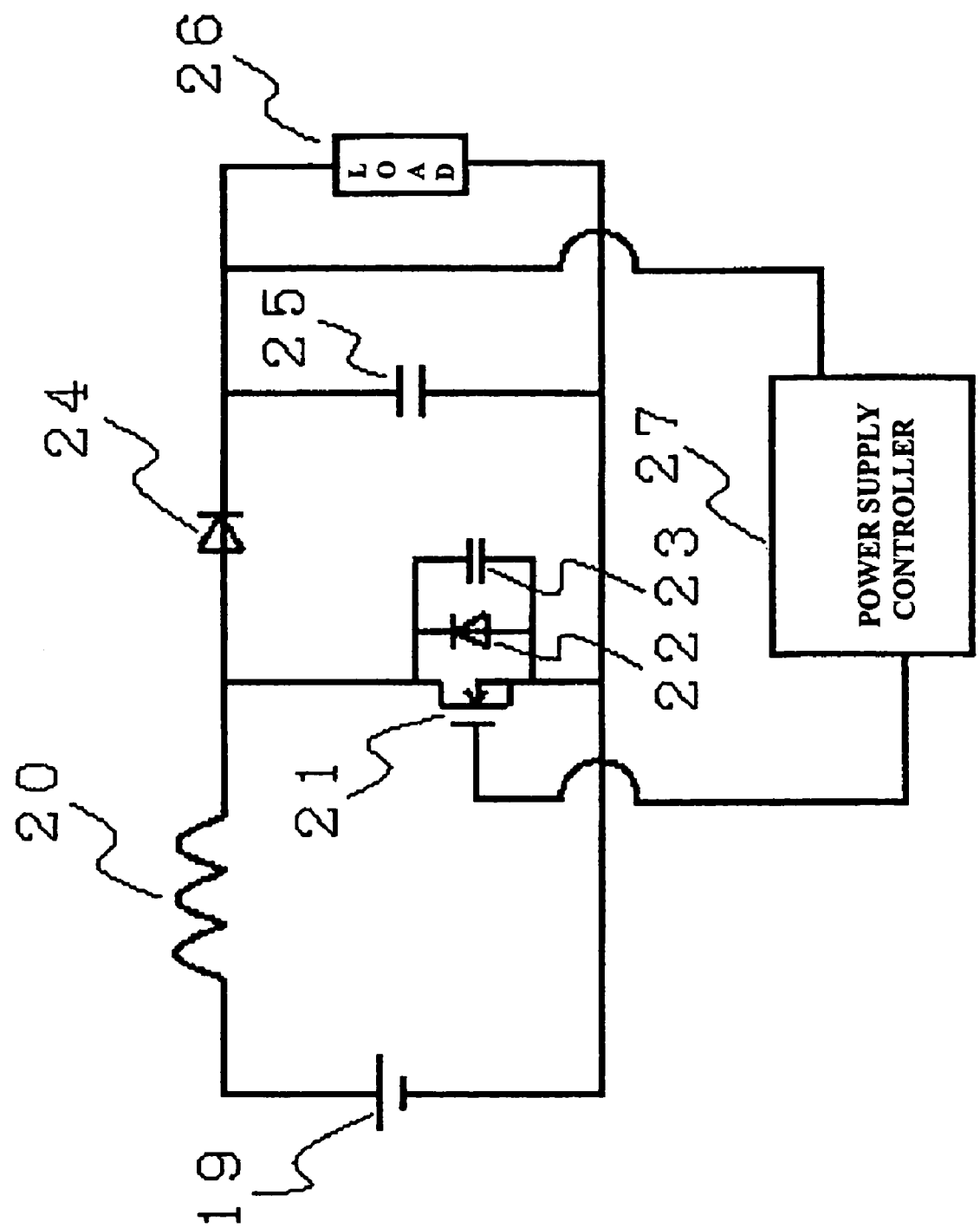
FIG. 1 is a schematic circuit diagram showing a conventional switching power supply circuit.
Figure 2:
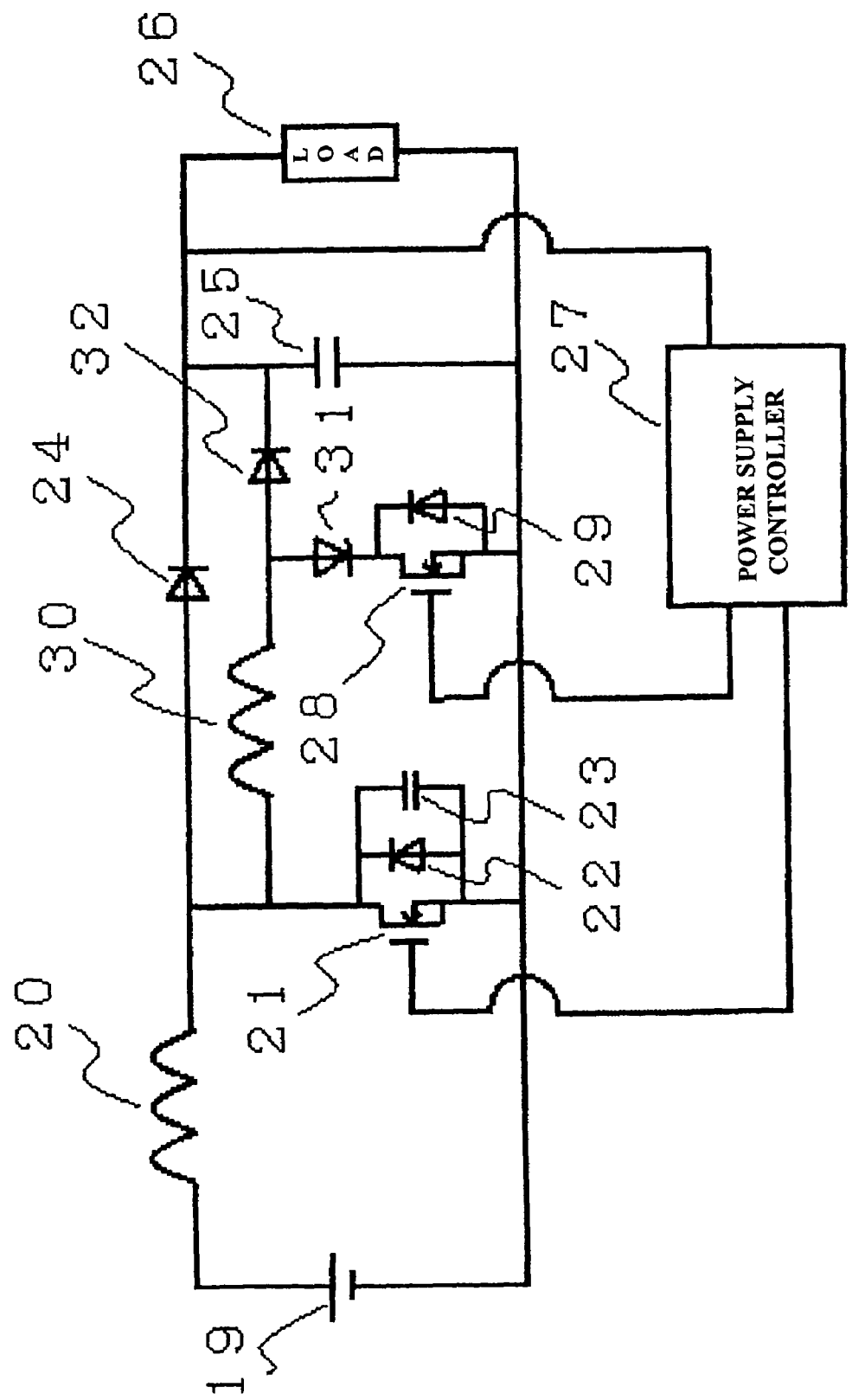
FIG. 2 is a schematic circuit diagram showing a conventional step-up switching power supply circuit.
Figure 3:
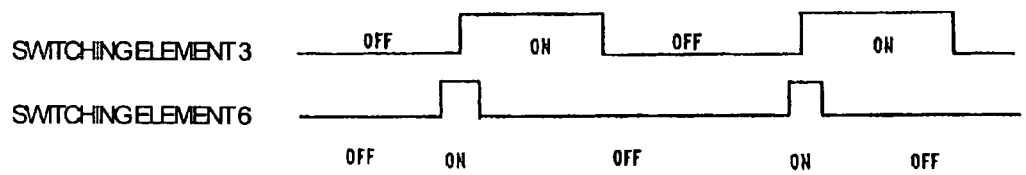
FIG. 3 is a timing chart for switching elements shown in FIG. 2.

Referring now to the drawings, a description of preferred embodiments of the present invention will be given in detail.

Figure 4:
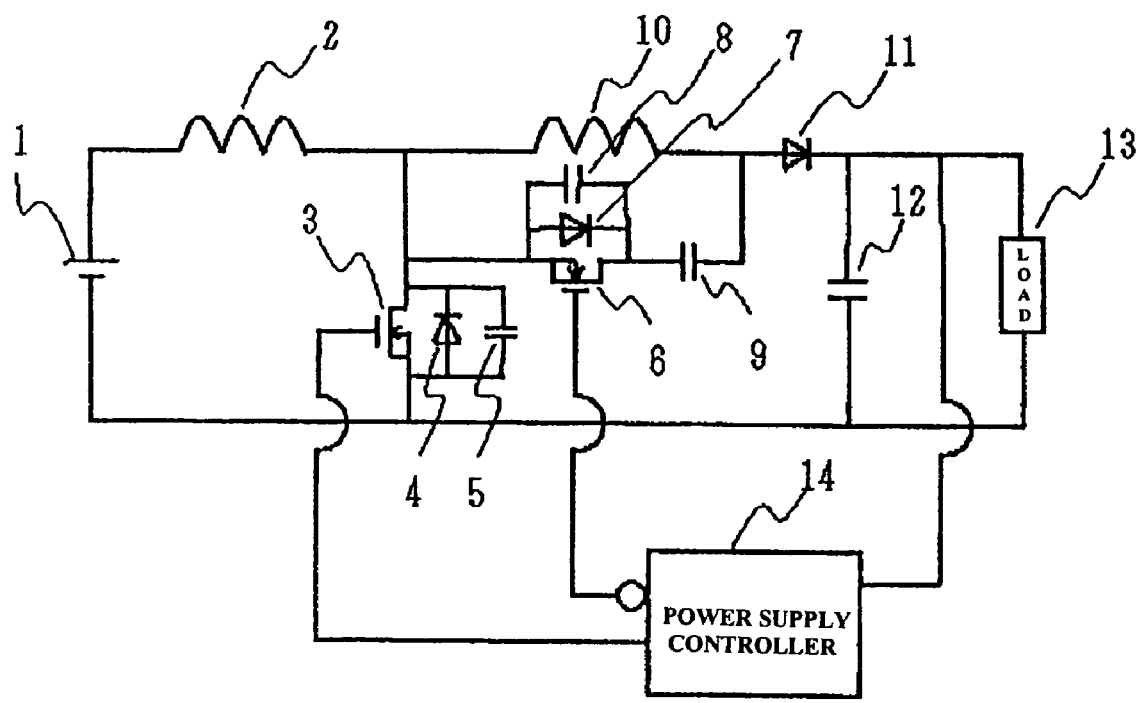
FIG. 4 is a schematic circuit diagram showing a step-up switching power supply circuit according to the first embodiment of the present invention.

In the following, a description will be given of the first embodiment of the present invention. FIG. 4 is a schematic circuit diagram showing a step-up circuit according to the first embodiment of the present invention.

Referring to FIG. 4, the step-up circuit comprises a direct-current power supply 1, a choking coil 2, a switching element 3, a diode 4, a capacitor 5, a switching element 6, a diode 7, a capacitor 8, a capacitor 9, a choking coil 10, a diode 11, a capacitor 12, a load 13 and a power supply controller 14.

The plus or positive terminal of the direct-current power supply 1 is connected to one side of the choking coil 2. The other side of the choking coil 2 is connected to one side of the switching element 3. The other side of the switching element 3 is connected to the minus or negative terminal of the direct-current power supply 1. The switching element 3, the diode 4 and the capacitor 5 are coupled in parallel with each other. The cathode or negative electrode of the diode 4 is connected with one side of the switching element 3, while the anode or positive electrode of the diode 4 is connected with the other side of the switching element 3.

Besides, one side of the choking coil 10 is connected to the other side of the choking coil 2, while the other side of the choking coil 10 is connected to the anode of the diode 11. One side of the choking coil 10 is connected to one side of the switching element 6. The other side of the switching element 6 is connected to one side of the capacitor 9. The other side of the capacitor 9 is connected to the anode of the diode 11.

Further, the switching element 6 is coupled in parallel with the diode 7 and the capacitor 8. The anode of the diode 7 is connected with one side of the switching element 6, while the cathode of the diode 7 is connected with the other side of the switching element 6.

Still further, the cathode of the diode 11 is connected with one side of the capacitor 12. The other side of the capacitor 12 is connected to the minus or negative terminal of the direct-current power supply 1. Additionally, the load 13 is coupled in parallel with the capacitor 12.

The a power supply controller 14 monitors output voltage, and controls the on-time of the switching element 3 (the period of time that the switching element 3 is in the on state) so as to keep the output voltage constant.

Figure 5:
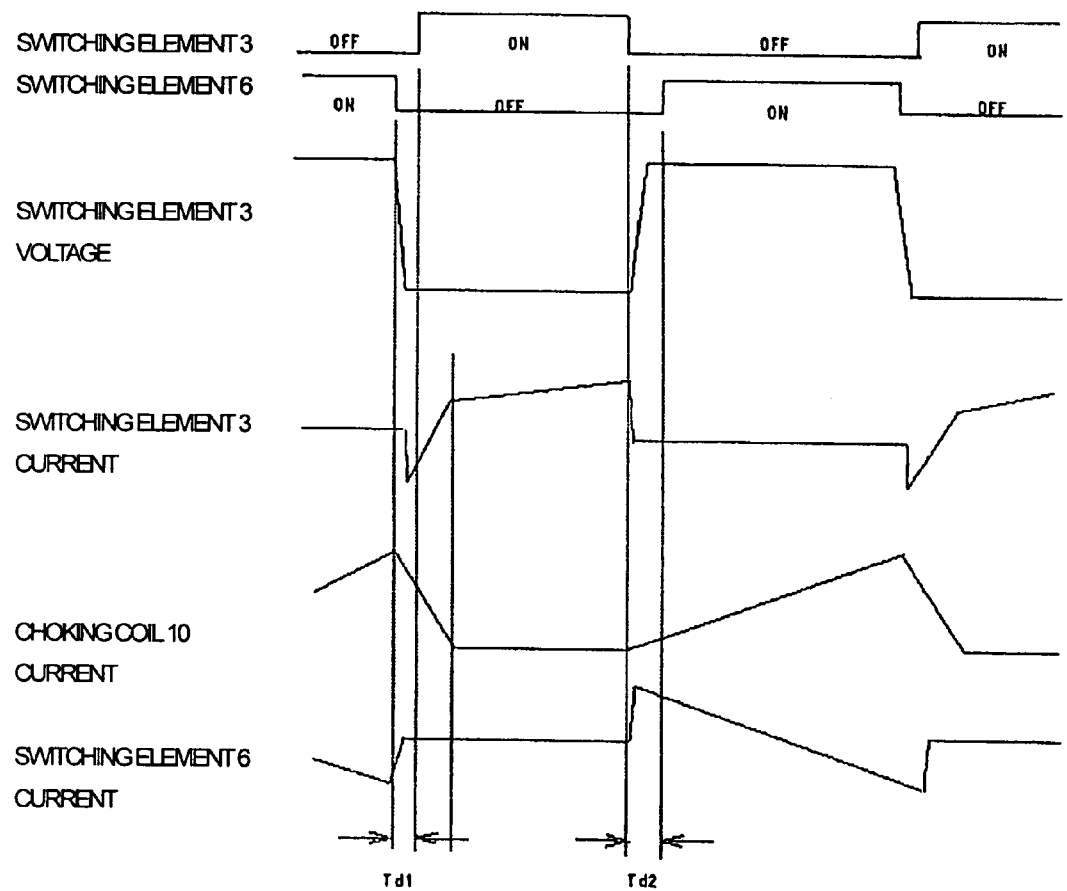
FIG. 5 is a timing chart for switching elements shown in FIG. 4.

In the following, a description will be made of the operation of the step-up circuit according to the first embodiment of the present invention. FIG. 5 is a timing chart for the switching elements 3 and 6.

As can be seen in FIG. 5, the switching elements 3 and 6 are alternately actuated to on and off. There are dead times Td1 and Td2 during which period both the switching elements 3 and 6 are off. When the switching element 3 is in the off state, and the switching element 6 in the on state is about to go into the off state, there are two paths through which current flows in the switching power supply circuit. That is, current passes through the choking coil 2, the choking coil 10, the diode 11 and the capacitor 12, and also it passes through the choking coil 10, the capacitor 9 and the switching element 6.

During dead time Td1 in which the switching element 6 has gone into the off state from the on state while the switching element 3 has yet to be actuated to on, the electric charge of the capacitor 5 which is coupled in parallel with the switching element 3 are discharged by the energy of the choking coil 10, and the capacitor 8 which is coupled in parallel with the switching element 6 is charged. Consequently, the voltage rises moderately across the switching element 6 as compared to the fall of the current that is passed through the switching element 6. Thus, the product of the voltage and current becomes small, and switching losses are reduced.

After the capacitor 8 has been charged and the capacitor 5 has been discharged, the diode 4 assumes the on state, and current flows along a path through the choking coil 10, the diode 11, the capacitor 12, and the diode 4. The switching element 3 is actuated to on while the diode 4 is on. In other words, the switching element 3 is switched on at a voltage of 0V (zero volts) or the switching element 3 carries out zero-voltage switching. Thereby, switching losses are reduced.

When the switching element 3 is actuated to on, current takes two paths. More specifically, current passes through the choking coil 2 and the switching element 3, and it passes through the choking coil 10, the diode 11, the capacitor 12 and the switching element 3. Accordingly, the difference between the current passing through the choking coil 2 and that passing through the choking coil 10 constitutes the current which flows through the switching element 3. Therefore, the current which passes through the switching element 3 rises until the choking coil 10 has completed the expenditure of energy.

When there is no current flowing through the choking coil 10, current takes the path through the choking coil 2 and the switching element 3 only. Thus, the choking coil 2 keeps storing energy.

During dead time Td2 in which the switching element 3 has gone into the off state from the on state while the switching element 3 has yet to be actuated to on, when the switching element 3 is actuated to off, the capacitor 5 which is coupled in parallel with the switching element 3 is charged by the discharge energy of the choking coil 2, and the capacitor 8 which is coupled in parallel with the switching element 6 is discharged.

On this occasion, the voltage rises moderately across the switching element 3 as compared to the fall of the current passing through the switching element 3 because of the capacitor 5. Thus, the product of the voltage and current becomes small, and switching losses are reduced.

After the capacitor 5 has been charged and the capacitor 8 has been discharged, the diode 7 that is coupled in parallel with the switching element 6 assumes the on state. Thereby, current flows along a path through the choking coil 2, the choking coil 10, the diode 11, and the capacitor 12, and it also flows along a path through the choking coil 2, the diode 7, the capacitor 9, the diode 11 and the capacitor 12.

The switching element 6 is actuated to on while current is passed through the diode 7. That is, the switching element 6 is switched on at a voltage of 0V (zero volts) or the switching element 6 carries out zero-voltage switching. Thereby, switching losses are reduced.

From the point of time when the switching element 3 is actuated to off, the current which flows through the choking coil 10 rises linearly from zero, while the current which flows through the switching element 6 drops linearly. After the lapse of one-half of the on-time of the switching element 6 (the period of time that the switching element 6 is on), the direction in which current flows through the switching element 6 changes, and current takes a path through the switching element 6, the choking coil 10 and the capacitor 9.

By performing the above-mentioned operations repeatedly, output voltage can be stepped up more than input voltage.

Incidentally, in accordance with the first embodiment of the present invention, the diodes and the capacitors coupled in parallel with the switching elements 3 and 6 can be replaced by parasitic diodes of an FET and parasitic capacitance, respectively.

As described above, the switching power supply circuit of the present invention is capable of reducing switching losses which occur when the switching elements go into the on state from the off state or go into the off state from the on state.

Figure 6:
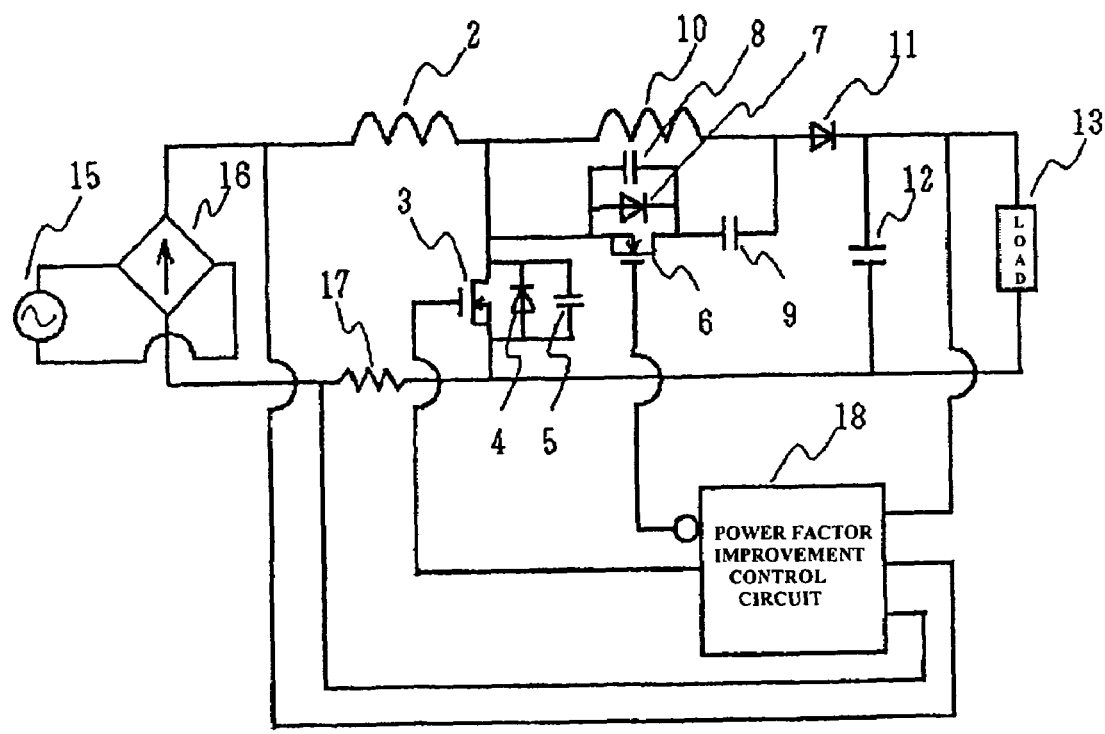
FIG. 6 is a schematic circuit diagram showing a power factor improvement circuit according to the second embodiment of the present invention.

In the following, a description will be made of the second embodiment of the present invention. FIG. 6 is a schematic circuit diagram showing the configuration of a switching power supply circuit according to the second embodiment of the present invention. In the switching power supply circuit of FIG. 6, a commercial AC power supply 15 and a rectifier 16 are used for input in replacement of the direct-current power supply 1 of the step-up circuit shown in FIG. 4.

The circuit shown in FIG. 6 is a power factor improvement circuit for providing input current with a sine waveform as with input voltage. The input of the power factor improvement circuit is in general AC 100V to AC 240V, and a DC voltage of about DC 360V is output therefrom.

The power factor improvement control circuit 18 detects input current by output voltage, input voltage and a current detection resistor 17, and controls the input current and the output voltage. The circuit operates in the same manner as that shown in FIG. 4.

With the use of the circuit shown in FIG. 6, a power factor improvement circuit causing fewer losses can be achieved. Incidentally, while the power factor improvement circuit is implemented in a step-up circuit in the second embodiment of the present invention since the power factor improvement circuit is generally a step-up circuit for simplicity in circuitry and efficiency, it can also be implemented in a step-down circuit and a booster (step-up/down) circuit.

Figure 7:
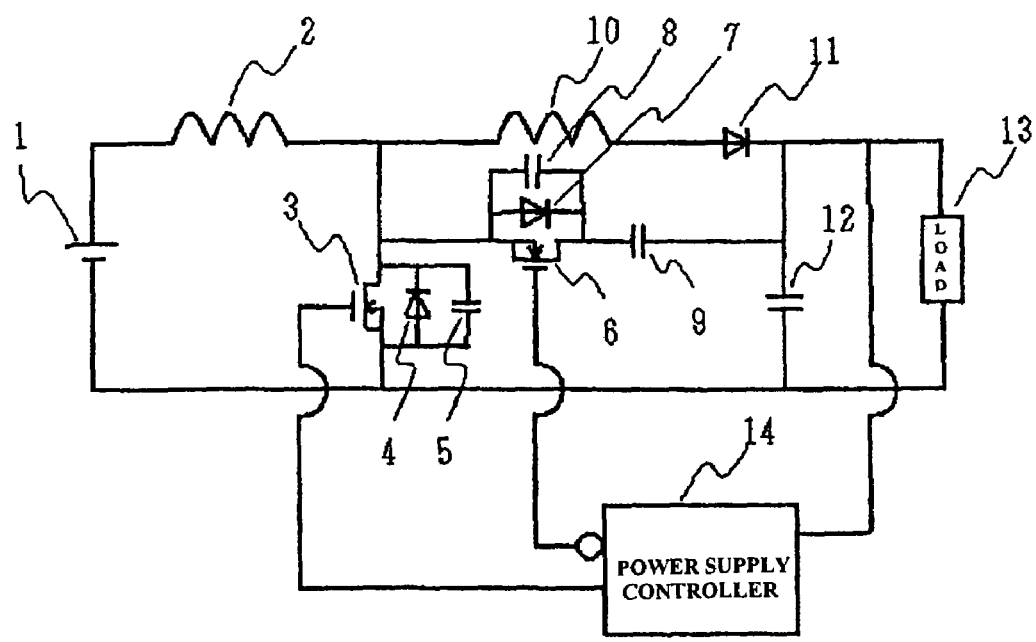
FIG. 7 is a schematic circuit diagram showing a step-up switching power supply circuit according to the third embodiment of the present invention.

FIG. 7 is a schematic circuit diagram showing a step-up switching power supply circuit according to the third embodiment of the present invention. The switching power supply circuit of this embodiment is basically similar to that of FIG. 4 except that the other side of the capacitor 9 is connected to the cathode of the diode 11 rather than the anode thereof The circuit of FIG. 7 operates in the same manner as that shown in FIG. 4.

Figure 8:
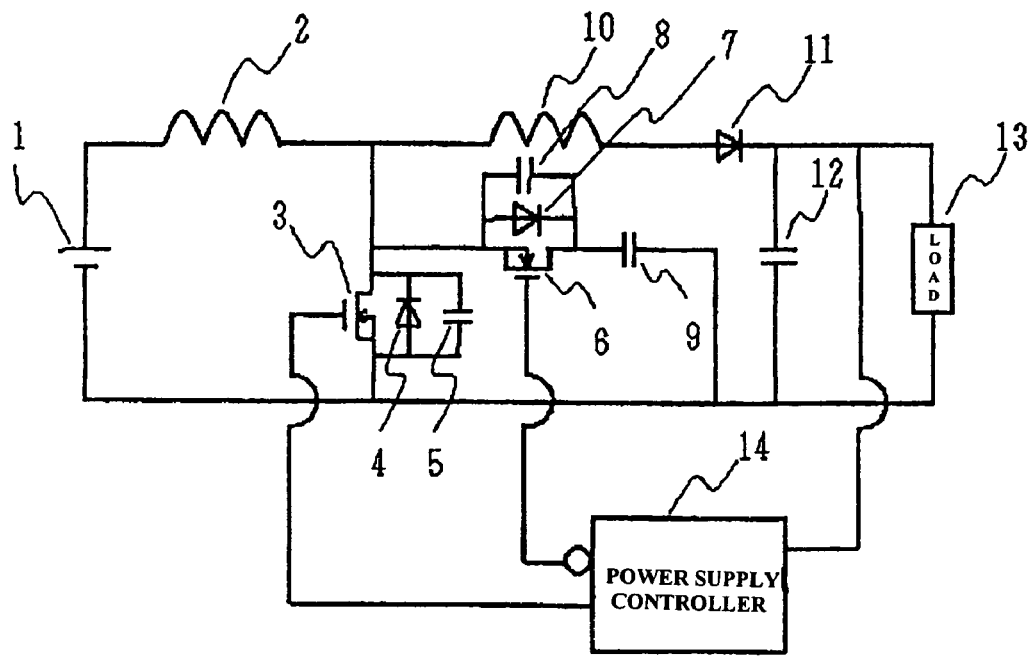
FIG. 8 is a schematic circuit diagram showing a step-up switching power supply circuit according to the fourth embodiment of the present invention.

FIG. 8 is a schematic circuit diagram showing a step-up switching power supply circuit according to the fourth embodiment of the present invention. The switching power supply circuit of this embodiment is basically similar to that of FIG. 4 except that the other side of the capacitor 9 is connected to the minus or negative terminal of the direct-current power supply 1 rather than the anode of the diode 11. The circuit of FIG. 8 operates in the same manner as that shown in FIG. 4.

Figure 9:
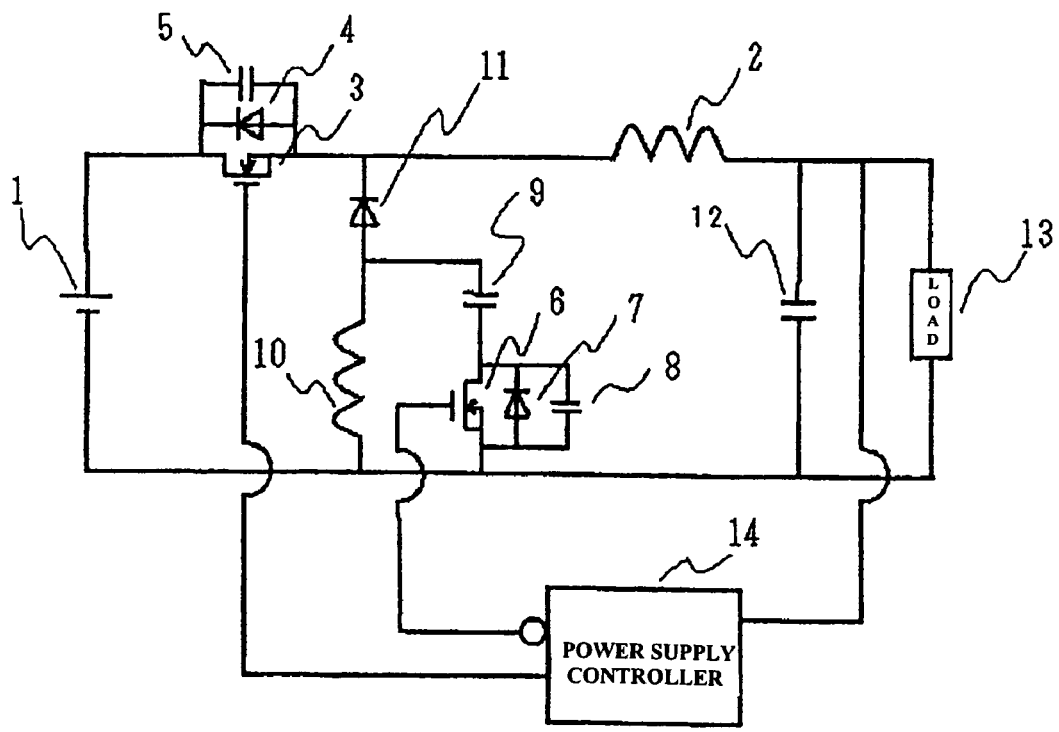
FIG. 9 is a schematic circuit diagram showing a step-down switching power supply circuit according to the fifth embodiment of the present invention.

FIG. 9 is a schematic circuit diagram showing a step-down switching power supply circuit according to the fifth embodiment of the present invention. In this embodiment, the step-up circuit of FIG. 4 in the first embodiment is altered into a step-down circuit. Respective switching elements operate in the same manner as those shown in FIG. 4. Additionally, the timing chart of FIG. 5 is applicable to the switching elements of the step-down circuit according to the fifth embodiment.

Figure 10:
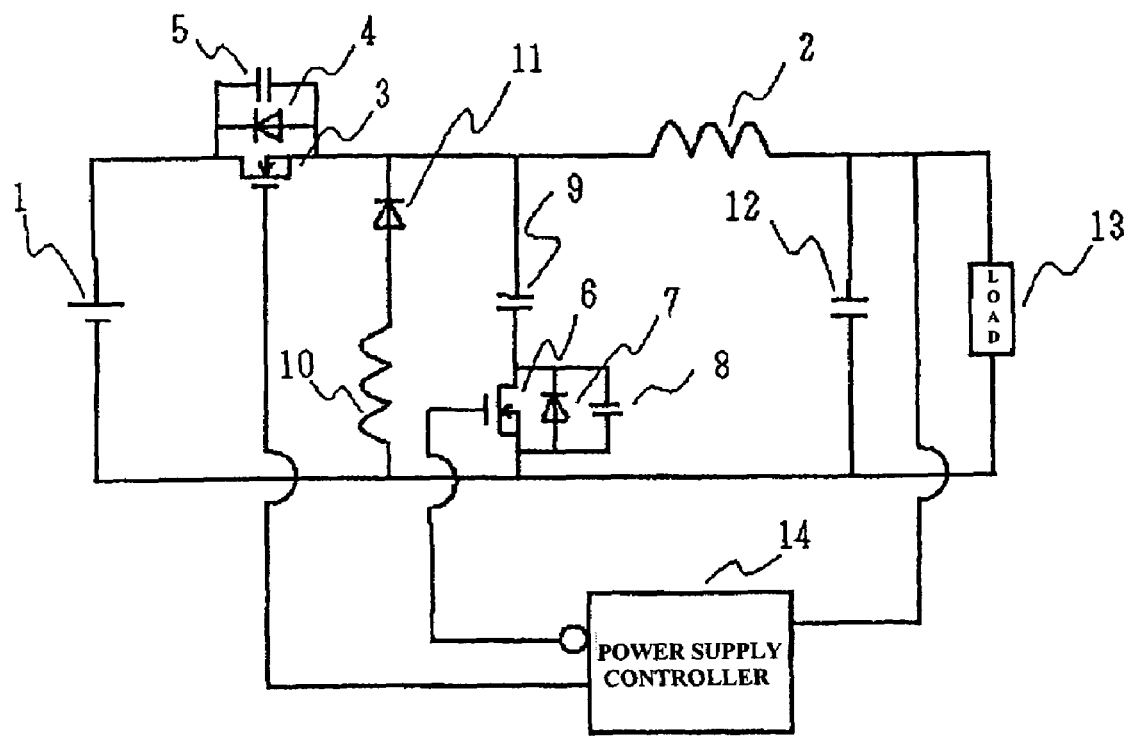
FIG. 10 is a schematic circuit diagram showing a step-down switching power supply circuit according to the sixth embodiment of the present invention.

FIG. 10 is a schematic circuit diagram showing a step-down switching power supply circuit according to the sixth embodiment of the present invention. The switching power supply circuit of this embodiment is basically similar to that of FIG. 9 except that the other side of the capacitor 9 is connected to the cathode of the diode 11 rather than the anode thereof. The circuit of FIG. 10 operates in the same manner as that shown in FIG. 9.

Figure 11:
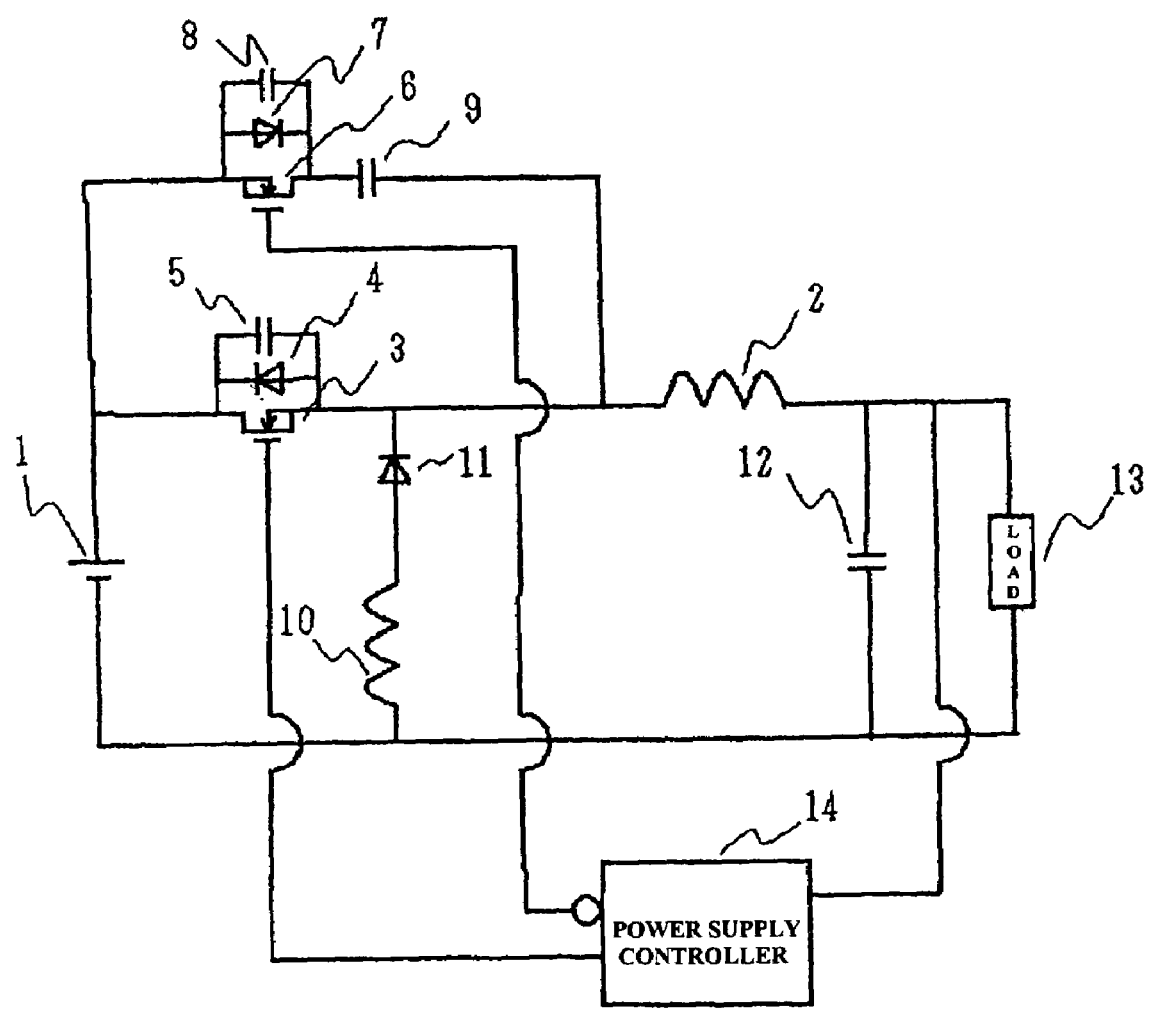
FIG. 11 is a schematic circuit diagram showing a step-down switching power supply circuit according to the seventh embodiment of the present invention.

FIG. 11 is a schematic circuit diagram showing a step-down switching power supply circuit according to the seventh embodiment of the present invention. The switching power supply circuit of this embodiment is basically similar to that of FIG. 10 except that the other side of the switching element 6, the anode of the diode 6 and the other side of the capacitor 8 are connected to the plus or positive terminal of the direct-current power supply 1. The circuit of FIG. 11 operates in the same manner as that shown in FIG. 9.

Figure 12:
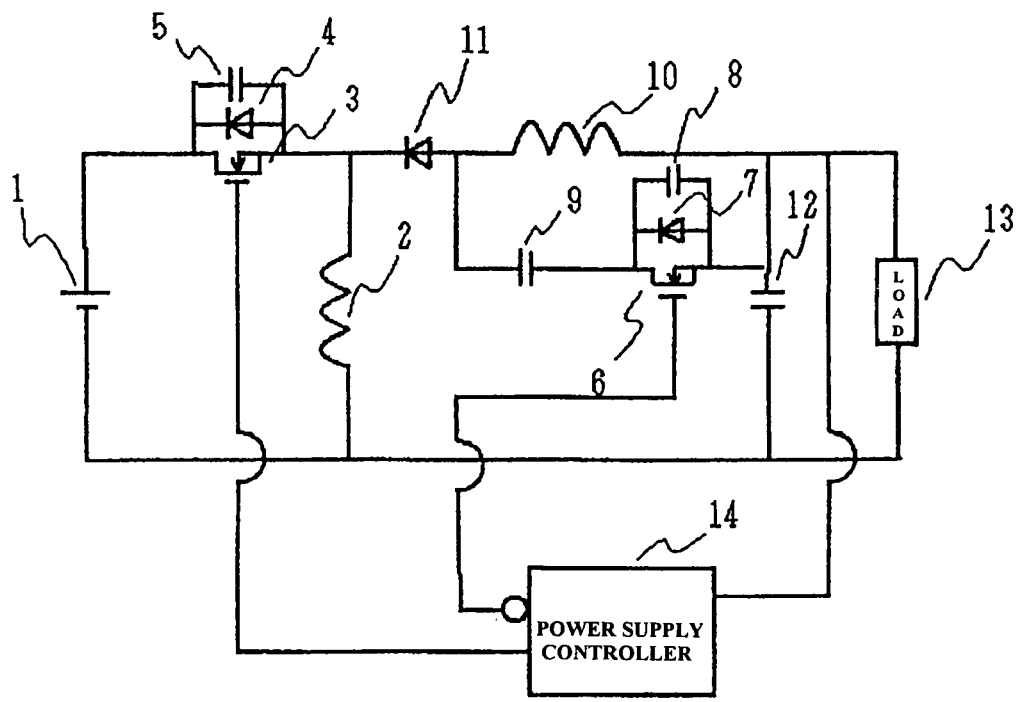
FIG. 12 is a schematic circuit diagram showing a step-up/down switching power supply circuit according to the eighth embodiment of the present invention.

FIG. 12 is a schematic circuit diagram showing a step-up/down switching power supply circuit according to the eighth embodiment of the present invention. In this embodiment, the step-up circuit of FIG. 4 in the first embodiment is altered into a step-up/down circuit. Respective switching elements operate in the same manner as those shown in FIG. 4. Additionally, the timing chart of FIG. 5 is applicable to the switching elements of the step-up/down circuit according to the eighth embodiment.

Figure 13:
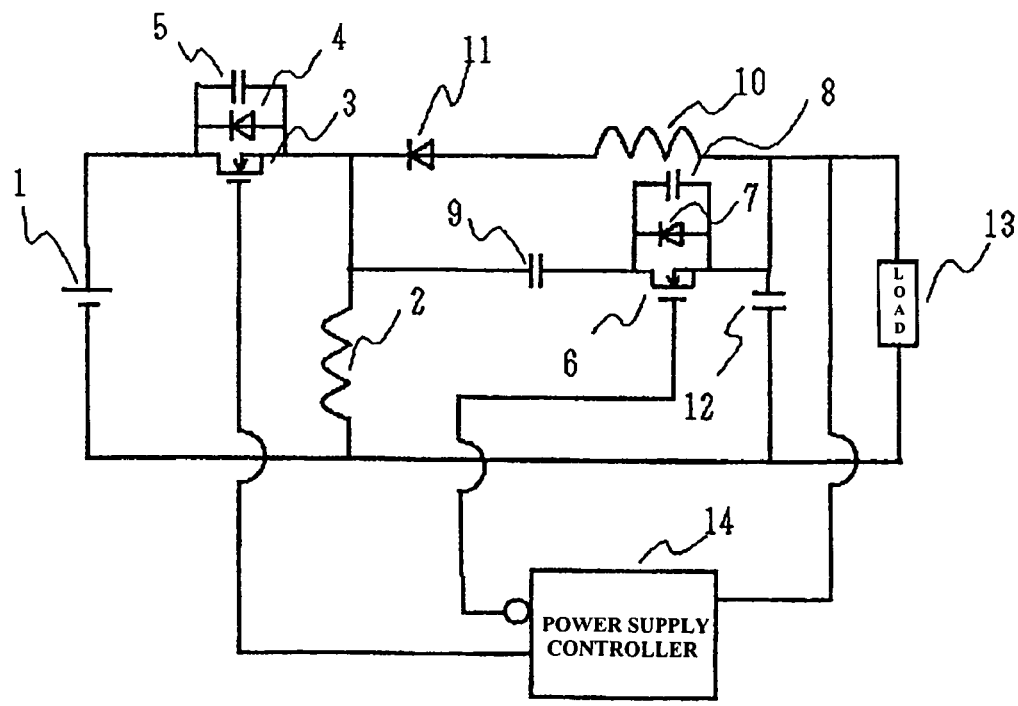
FIG. 13 is a schematic circuit diagram showing a step-up/down switching power supply circuit according to the ninth embodiment of the present invention.

FIG. 13 is a schematic circuit diagram showing a step-up/down switching power supply circuit according to the ninth embodiment of the present invention. The switching power supply circuit of this embodiment is basically similar to that of FIG. 12 except that the other side of the capacitor 9 is connected to the cathode of the diode 11 rather than the anode thereof. The circuit of FIG. 13 operates in the same manner as that shown in FIG. 12.

Figure 14:
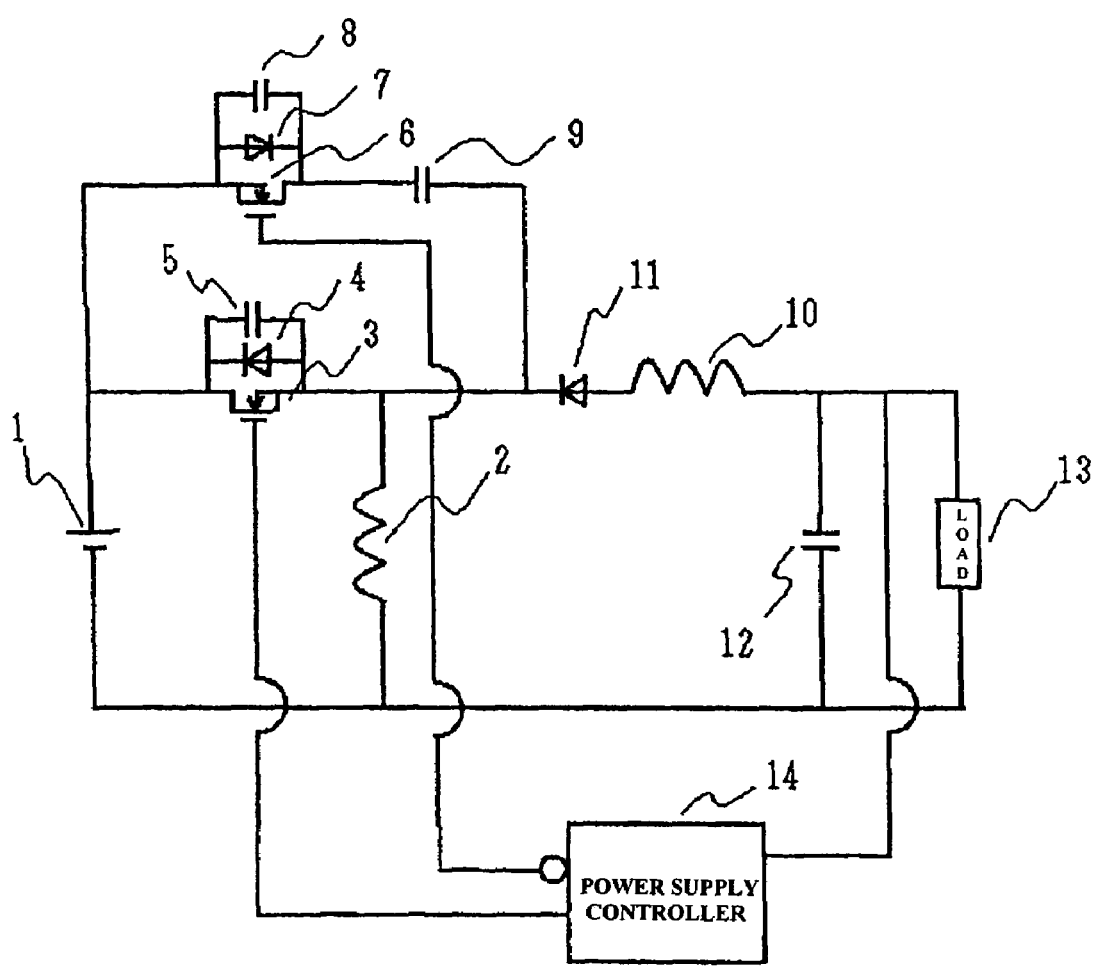
FIG. 14 is a schematic circuit diagram showing a step-up/down switching power supply circuit according to the tenth embodiment of the present invention.

FIG. 14 is a schematic circuit diagram showing a step-up/down switching power supply circuit according to the tenth embodiment of the present invention. The switching power supply circuit of this embodiment is basically similar to that of FIG. 13 except that the other side of the switching element 6, the anode of the diode 6 and the other side of the capacitor 8 are connected to the plus or positive terminal of the direct-current power supply 1. The circuit of FIG. 14 operates in the same manner as that shown in FIG. 12.

As is described above, with the circuitry including a series connection of the switching element 6 and the capacitor 9 and a series connection of the diode 11 and the choking coil 10, it is possible to obtain a switching circuit having functions for reducing switching losses and suppressing the recovery current of the diodes.

As set forth hereinabove, in accordance with the present invention, it is possible to reduce switching losses which occur when the switching element goes into the on state from the off state or goes into the off state from the on state owing to the zero-voltage switching and a delay in the rise of the voltage across the switching element caused by a capacitor.

Moreover, since the diode is coupled in series with the choking coil, it is possible to suppress the recovery current in the diode.

Furthermore, the above-described circuit capable of reducing switching losses can be implemented in a variety of forms or styles as any one of step-up, step-down and step-up/down circuits.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electrical circuit for stepping up voltage and stepping down voltage, comprising:
   a series connection of a first switch circuit with a first choking coil;
   a series connection of a second switch circuit with a first terminal of a first capacitor;
   a parallel connection of a load with a second capacitor;
   a series connection of a first diode with a second choking coil;
   a switch control circuit for controlling switches; and
   a power supply; and
   wherein the second switch circuit is connected to a positive terminal of the power supply.

2. The electrical circuit claimed in claim 1, wherein the first and second switch circuits each comprise a switching element, a diode and a capacitor which are coupled in parallel with each other.

3. An electrical circuit for boosting voltage, comprising:
   a series connection of a first switch circuit with a first choking coil;
   a series connection of a second switch circuit with a first terminal of a first capacitor;
   a parallel connection of a load with a second capacitor;
   a series connection of a first diode with a second choking coil;
   a switch control circuit for controlling switches; and
   a power supply; and
   wherein a second terminal of the first capacitor is connected to a cathode of the first diode.

4. The electrical circuit claimed in claim 3, wherein the first and second switch circuits each comprise a switching element, a diode and a capacitor which are coupled in parallel with each other.

5. An electrical circuit for boosting voltage, comprising:
   a series connection of a first switch circuit with a first choking coil;
   a series connection of a second switch circuit with a first terminal of a first capacitor;
   a parallel connection of a load with a second capacitor;

a series connection of a first diode with a second choking coil;

a switch control circuit for controlling switches; and a power supply; and wherein a second terminal of the first capacitor is connected to an anode of the first diode.

6. The electrical circuit claimed in claim 5, wherein the first and second switch circuits each comprise a switching element, a diode and a capacitor which are coupled in parallel with each other.

7. The electrical circuit claimed in claim 6, wherein the power supply is an AC power supply and a rectifier, and the switch control circuit is a power factor improvement circuit.

8. An electrical circuit for stepping up voltage and stepping down voltage, comprising:

a series connection of a first switch circuit with a first choking coil;

a series connection of a second switch circuit with a first terminal of a first capacitor;

a parallel connection of a load with a second capacitor;

a series connection of a first diode with a second choking coil;

a switch control circuit for controlling switches; and a power supply; and wherein a second terminal of the first capacitor is connected to an anode of the first diode.

9. The electrical circuit claimed in claim 8, wherein the first and second switch circuits each comprise a switching element, a diode and a capacitor which are coupled in parallel with each other.

10. The electrical circuit claimed in claim 9, wherein the power supply is an AC power supply and a rectifier, and the switch control circuit is a power factor improvement circuit.

11. An electrical circuit for stepping down voltage, comprising:

a series connection of a first switch circuit with a first choking coil;

a series connection of a second switch circuit with a first terminal of a first capacitor;

a parallel connection of a load with a second capacitor;

a series connection of a first diode with a second choking coil;

a switch control circuit for controlling switches; and a power supply; and wherein a second terminal of the first capacitor is connected to an anode of the first diode.

12. The electrical circuit claimed in claim 11, wherein the first and second switch circuits each comprise a switching element, a diode and a capacitor which are coupled in parallel with each other.

13. The electrical circuit claimed in claim 12, wherein the power supply is an AC power supply and a rectifier, and the switch control circuit is a power factor improvement circuit.

14. An electrical circuit for stepping up voltage and stepping down voltage, comprising:

a series connection of a first switch circuit with a first choking coil;

a series connection of a second switch circuit with a first terminal of a first capacitor;

a parallel connection of a load with a second capacitor;

a series connection of a first diode with a second choking coil;

a switch control circuit for controlling switches; and a power supply; and wherein a second terminal of the first capacitor is connected to a cathode of the diode.

15. The electrical circuit claimed in claim 14, wherein the first and second switch circuits each comprise a switching element, a diode and a capacitor which are coupled in parallel with each other.

16. An electrical circuit for stepping down voltage, comprising:

a series connection of a first switch circuit with a first choking coil;

a series connection of a second switch circuit with a first terminal of a first capacitor;

a parallel connection of a load with a second capacitor;

a series connection of a first diode with a second choking coil;

a switch control circuit for controlling switches; and a power supply; and wherein the second switch circuit is connected to a positive terminal of the power supply.

17. The electrical circuit claimed in claim 16, wherein the first and second switch circuits each comprise a switching element, a diode and a capacitor which are coupled in parallel with each other.

18. An electrical circuit for stepping down voltage, comprising:

a series connection of a first switch circuit with a first choking coil;

a series connection of a second switch circuit with a first terminal of a first capacitor;

a parallel connection of a load with a second capacitor;

a series connection of a first diode with a second choking coil;

a switch control circuit for controlling switches; and a power supply; and wherein a second terminal the first capacitor is connected to a cathode of the diode.

19. The electrical circuit claimed in claim 18, wherein the first and second switch circuits each comprise a switching element, a diode and a capacitor which are coupled in parallel with each other.

* * * * *